US012596069B2

(12) United States Patent
Fu et al.

(10) Patent No.: US 12,596,069 B2
(45) Date of Patent: Apr. 7, 2026

(54) METHOD FOR EVALUATING DEGASSING EFFECT OF CROSS-LINKED POLYETHYLENE CABLE

(71) Applicant: ELECTRIC PWR RESEARCH INST., CHINA SOUTH. PWR GRID, Guangzhou (CN)

(72) Inventors: Mingli Fu, Guangzhou (CN); Shuai Hou, Guangzhou (CN); Xiaolin Li, Guangzhou (CN); Bin Zhang, Guangzhou (CN); Yifan Zhang, Guangzhou (CN); Wenbo Zhu, Guangzhou (CN); Baojun Hui, Guangzhou (CN); Bin Feng, Guangzhou (CN); Yunpeng Zhan, Guangzhou (CN); Xiao Chen, Guangzhou (CN); Shu Xu, Guangzhou (CN); Guoxing Wu, Guangzhou (CN)

(73) Assignee: ELECTRIC POWER RESEARCH INSTITUTE, CHINA SOUTHERN POWER GRID, Guangzhou (CN)

( * ) Notice: Subject to any disclaimer, the term of this patent is extended or adjusted under 35 U.S.C. 154(b) by 129 days.

(21) Appl. No.: 18/709,364

(22) PCT Filed: Dec. 1, 2021

(86) PCT No.: PCT/CN2021/134868
§ 371 (c)(1),
(2) Date: May 10, 2024

(87) PCT Pub. No.: WO2023/082380
PCT Pub. Date: May 19, 2023

(65) Prior Publication Data
US 2025/0035550 A1　Jan. 30, 2025

(30) Foreign Application Priority Data
Nov. 11, 2021　(CN) .......................... 202111332132.0

(51) Int. Cl.
G01N 21/47 (2006.01)
G01N 1/44 (2006.01)

(52) U.S. Cl.
CPC ........... G01N 21/4738 (2013.01); G01N 1/44 (2013.01); *G01N 2201/06113* (2013.01)

(58) Field of Classification Search
CPC ................. G01N 21/4738; G01N 1/44; G01N 2201/06113
See application file for complete search history.

(56) References Cited

U.S. PATENT DOCUMENTS

2010/0280664 A1　11/2010　Kemper
2019/0277768 A1　9/2019　Mantyla

FOREIGN PATENT DOCUMENTS

CN　105606981 A　5/2016
CN　206248557 U　6/2017
(Continued)

OTHER PUBLICATIONS

International Search Report for corresponding Application No. PCT/CN2021/134868 dated Jul. 27, 2022, 4 pages.
(Continued)

*Primary Examiner* — Jamil Ahmed
(74) *Attorney, Agent, or Firm* — Yue (Robert) Xu; Apex Attorneys at Law, LLP

(57) ABSTRACT

A method for evaluating a degassing effect of a cross-linked polyethylene cable, includes: acquiring a cable sample to be detected; heating the cable sample to be detected; under a darkroom condition, acquiring at least one light spot image of said transparent cable sample under irradiation of a monochromatic laser light source; extracting light intensity data of the at least one light spot image in a preset light spot image range; normalizing the light intensity data, and obtaining the maximum value and an average value of
(Continued)

normalized light intensity coefficients of said transparent cable sample in a preset thickness range of the insulating layer; calculating a degassing uniformity coefficient according to the maximum value and the average value; and obtaining an evaluation result of the degassing effect of the cross-linked polyethylene cable according to the maximum value, the average value, and the degassing uniformity coefficient.

9 Claims, 3 Drawing Sheets

(56) References Cited

FOREIGN PATENT DOCUMENTS

| CN | 207465994 | U | | 6/2018 | |
| CN | 108398404 | A | | 8/2018 | |
| CN | 109752318 | A | | 5/2019 | |
| CN | 111276291 | A | | 6/2020 | |
| CN | 111610197 | A | | 9/2020 | |
| CN | 111784684 | A | | 10/2020 | |
| CN | 113092204 | A | * | 7/2021 | ......... G01R 31/1218 |
| JP | 2017079729 | A | | 5/2017 | |

OTHER PUBLICATIONS

Written Opinion for corresponding Application No. PCT/CN2021/134868 dated Jul. 27, 2022, 3 pages.
Chinese Office Action for corresponding Application No. 202111332132.0 dated Jan. 10, 2024, 6 pages.
European Patent Office, Extended Search Report issued in corresponding Application No. 21963818.6, dated May 12, 2025, 5 pp.
Andrews et al., "The Role of Degassing in XLPE Power Cable Manufacture," IEEE Electrical Insulation Magazine, 2006, vol. 22, No. 6, pp. 5-16.

* cited by examiner

METHOD FOR EVALUATING DEGASSING EFFECT OF CROSS-LINKED POLYETHYLENE CABLE

CROSS REFERENCE TO RELATED DISCLOSURE

The present application is a US National Stage Application of PCT international application PCT/CN2021/134868, filed Dec. 1, 2021, which claims priority to Chinese Patent Disclosure with No. 202111332132.0, entitled "Method for Evaluating Degassing Effect of Cross-Linked Polyethylene Cable", and filed Nov. 11, 2021, the contents of which are incorporated herein by reference in their entirety.

TECHNICAL FIELD

The present disclosure relates to the field of power cable technology, and particularly to a method for evaluating a degassing effect of a cross-linked polyethylene cable.

BACKGROUND

The cross-linked polyethylene is widely used as the main insulation material of the power cable due to its superior thermal, electrical, mechanical and processing performances. In the production process of the cross-linked polyethylene cable, the cross-linking agent dicumyl peroxide (DCP) may generate cross-linking by-products during the cross-linking process, such as acetophenone, cumyl alcohol, alpha methyl styrene and methane. The DCP by-products retained inside the cross-linked polyethylene cable may reduce the mechanical and insulation performances of the cross-linked polyethylene cable, and partial discharge may occur, thereby endangering the reliability of the long-term operation of the cable. Therefore, it is necessary for the production process of the cross-linked polyethylene cable to have sufficient degassing time to discharge the cross-linked by-products in order to guarantee the main insulation performance of the cross-linked polyethylene cable.

However, too long degassing time may lead to reduced production efficiency and extended delivery cycle of the cross-linked polyethylene cable. Excessively high degassing temperature may cause the cross-linked polyethylene insulated cable to become soft and extruded due to heat. Shorter degassing time or excessively low degassing temperature may lead to dissatisfied degassing effect and unqualified insulation performance of the cross-linked polyethylene cable. Therefore, there is an urgent need to develop a method for evaluating the degassing effect of the cross-linked polyethylene cable to guarantee the safe and reliable operation of the power grid.

At present, the degassing evaluation result of the cross-linked polyethylene cable is obtained through partial discharge detection of the cross-linked polyethylene cable. However, the sensitivity of this method is limited and may be affected by many test conditions, which results in lower accuracy of the evaluation result. Difference.

SUMMARY

In order to address the technical problem of lower accuracy of the evaluation result in the existing technology, the purpose of the embodiments of the present disclosure is to provide a method for evaluating a degassing effect of a cross-linked polyethylene cable capable of efficiently and quickly evaluating the degassing effect of the cross-linked polyethylene cable, which has a higher accuracy.

In order to achieve the above purpose, a method for evaluating a degassing effect of a cross-linked polyethylene cable is provided in the embodiment of the present disclosure, including:

acquiring a to-be-tested cable sample which is a hollow cross-linked polyethylene cable insulated wire core with an insulating layer and an inner shielding layer;

heating the to-be-tested cable sample to obtain a transparent to-be-tested cable sample with a transparent insulating layer;

acquiring at least one light spot image of the transparent to-be-tested cable sample formed by irradiation under a monochromatic laser light source under a darkroom condition;

extracting light intensity data of the at least one light spot image within a preset light spot image range;

performing normalization processing on the light intensity data to obtain a relationship between a thickness of the insulating layer and a normalized light intensity coefficient;

acquiring a maximum value and an average value of normalized light intensity coefficients of the transparent to-be-tested cable sample within a preset thickness range of the insulating layer according to the relationship between the thickness of the insulating layer and the normalized light intensity coefficient;

calculating a degassing uniformity coefficient according to the maximum value and the average value; and obtaining an evaluation result of the degassing effect of the cross-linked polyethylene cable according to the maximum value, the average value, and the degassing uniformity coefficient.

As an improvement, the acquiring the to-be-tested cable sample which is the hollow cross-linked polyethylene cable insulated wire core with the insulating layer and the inner shielding layer may include:

acquiring an insulated wire core of the cross-linked polyethylene cable;

cutting the insulated wire core to obtain an insulated to-be-tested wire core with an axial length equal to a preset length;

performing removing processing on the insulated to-be-tested wire core, and retaining the insulating layer and the inner shielding layer of the insulated to-be-tested wire core; and polishing an outer surface of the insulating layer of the insulated to-be-tested wire core after the removing processing, and obtaining the to-be-tested cable sample.

As an improvement, the heating the to-be-tested cable sample to obtain the transparent to-be-tested cable sample with the transparent insulating layer may include:

heating dimethyl silicone oil in a transparent oil tank, after the dimethyl silicone oil is heated to a preset temperature range and the temperature remains constant, placing the to-be-tested cable sample into the dimethyl silicone oil in a mode where a radial direction of the to-be-tested cable sample is horizontal, to heat the insulating layer of the to-be-tested cable sample to a transparent state, and obtaining the transparent to-be-tested cable sample.

As an improvement, the method may further include:

after obtaining the transparent to-be-tested cable sample, covering the transparent oil tank with a transparent glass cover to exhaust air between the transparent glass cover and the dimethyl silicone oil.

As an improvement, the acquiring at least one light spot image of the transparent to-be-tested cable sample irradiated with the monochromatic laser light source under the dark-room condition may include:

under the darkroom condition, horizontally irradiating the insulating layer of the transparent to-be-tested cable sample by the monochromatic laser light source emitted from a laser transmitter, to allow an axis line of the monochromatic laser light source to direct to an axis line of the transparent to-be-tested cable sample in an axial direction of the transparent to-be-tested cable sample; and photographing, by a CCD industrial camera, scattered light spots produced by the monochromatic laser light source in the insulating layer of the transparent to-be-tested cable sample at an angle of the CCD industrial camera perpendicular to the monochromatic laser light source, and obtaining the at least one light spot image.

As an improvement, the photographing, by the CCD industrial camera, scattered light spots produced by the monochromatic laser light source in the insulating layer of the transparent to-be-tested cable sample at the angle of the CCD industrial camera perpendicular to the monochromatic laser light source and obtaining the at least one light spot image may include:

rotating the transparent to-be-tested cable sample by 90°, and photographing, by the CCD industrial camera, the scattered light spots produced by the monochromatic laser light source in the insulating layer of the transparent to-be-tested cable sample for each rotation of 90°, with the photographing angle of the CCD industrial camera perpendicular to the monochromatic laser light source, and obtaining four light spot images.

As an improvement, the preset light spot image range has a length equal to a diameter of the insulating layer of the to-be-tested cable sample and a width equal to 1 mm.

As an improvement, the performing the normalization processing on the light intensity data to obtain the relationship between the thickness of the insulating layer and the normalized light intensity coefficient may include:

determining an average light intensity within a preset distance from the outer surface of the insulating layer of the transparent to-be-tested cable sample as a calibration light intensity, processing light intensities corresponding to other portions in proportion, and obtaining normalized light intensity coefficients;

drawing a relationship curve between the thickness of the insulating layer and the normalized light intensity coefficient according to the thickness of the insulating layer of the transparent to-be-tested cable sample and the normalized light intensity coefficients.

As an improvement, the calculating the degassing uniformity coefficient according to the maximum value and the average value may include:

calculating the degassing uniformity coefficient according to a following formula:

$$P = Q_{av}/Q_{max},$$

where $Q_{av}$ denotes the average value of normalized light intensity coefficients, and $Q_{max}$ denotes the maximum value of the normalized light intensity coefficients.

Compared to the existing technology, according to the method for evaluating the degassing effect of the cross-linked polyethylene cable provided by the embodiments of the present disclosure, the to-be-tested cable sample is photographed in the direction perpendicular to the mono-chromatic laser light source to obtain the light spot images, the light intensity data of the light spot images is acquired in the radial direction of the insulating layer and is normalized, the maximum value and the average value of the normalized light intensity coefficients of the transparent to-be-tested cable sample in the preset thickness range of the insulating layer are obtained, the degassing uniformity coefficient is calculated and obtained, and the evaluation result of the degassing effect of the cross-linked polyethylene cable is obtained according to the maximum value, the average value and the degassing uniformity coefficient. Accordingly, the degassing effect of the cross-linked polyethylene cable is evaluated from the perspective of physical defects, which efficiently and quickly evaluates the degassing effect of the cross-linked polyethylene cable, and has a higher accuracy.

DETAILED DESCRIPTION

The technical solution in the embodiments of the present disclosure will be clearly and completely described below with reference to the accompanying drawings in the embodiments of the present disclosure. Obviously, the described embodiments are only some embodiments of the present disclosure, but not all the embodiments. Based on the embodiments of the present disclosure, all other embodiments obtained by those of ordinary skill in the art without creative efforts shall fall within the protection scope of the present disclosure.

Figure 1:
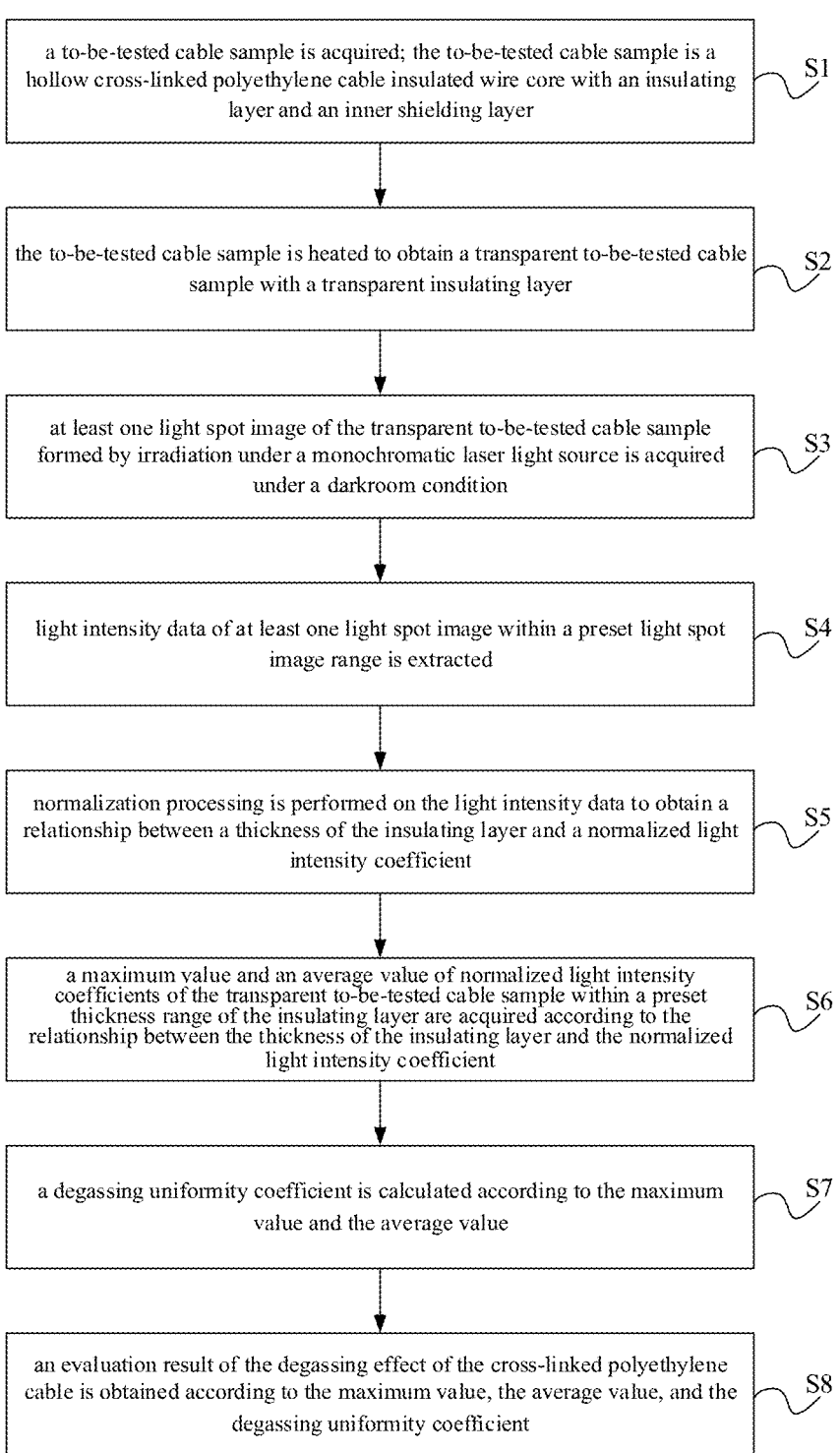
FIG. 1 is a flow chart showing a method for evaluating a degassing effect of a cross-linked polyethylene cable according to an embodiment of the present disclosure.

Referring to FIG. 1, it is a flow chart of a method for evaluating a degassing effect of a cross-linked polyethylene cable according to an embodiment of the present disclosure. The method for evaluating the degassing effect of the cross-linked polyethylene cable may include following steps.

S1: a to-be-tested cable sample is acquired. The to-be-tested cable sample is a hollow cross-linked polyethylene cable insulated wire core with an insulating layer and an inner shielding layer.

S2: the to-be-tested cable sample is heated to obtain a transparent to-be-tested cable sample with a transparent insulating layer.

S3: at least one light spot image of the transparent to-be-tested cable sample formed by irradiation under a monochromatic laser light source is acquired under a darkroom condition.

S4: light intensity data of at least one light spot image within a preset light spot image range is extracted.

S5: normalization processing is performed on the light intensity data to obtain a relationship between a thickness of the insulating layer and a normalized light intensity coefficient.

S6: a maximum value and an average value of normalized light intensity coefficients of the transparent to-be-tested cable sample within a preset thickness range of the insulating layer are acquired according to the relationship between the thickness of the insulating layer and the normalized light intensity coefficient.

S7: a degassing uniformity coefficient is calculated according to the maximum value and the average value.

S8: an evaluation result of the degassing effect of the cross-linked polyethylene cable is obtained according to the maximum value, the average value, and the degassing uniformity coefficient.

It should be appreciated that in the embodiment of the present disclosure, the smaller the normalized light intensity coefficient of a certain point in the transparent to-be-tested cable sample, the better the degassing effect at that point; the greater the maximum value of the normalized light intensity coefficient, the worse the degassing effect, and the larger the size of the micropore defects existing in the insulating layer of the cross-linked polyethylene cable; the larger the average value of the normalized light intensity coefficient, the worse the degassing effect, and the greater the number of microporous defects existing in the insulating layer of the cross-linked polyethylene cable; the greater the degassing uniformity coefficient, the better the degassing uniformity within the insulating layer of the cross-linked polyethylene cable, which indicates that the difference in degassing effects at different positions in the insulating layer is smaller.

Specifically, the step of acquiring the to-be-tested cable sample which is a hollow cross-linked polyethylene cable insulated wire core with the insulating layer and the inner shielding layer includes:

an insulated wire core of the cross-linked polyethylene cable is acquired;

the insulated wire core is cut to obtain an insulated to-be-tested wire core with an axial length equal to a preset length;

removing processing is performed on the insulated to-be-tested wire core, and the insulating layer and the inner shielding layer of the insulated to-be-tested wire core are retained;

an outer surface of the insulating layer of the insulated to-be-tested wire core is polished after the removing processing is performed, to obtain the to-be-tested cable sample.

It should be appreciated that the step of cutting off insulated wire core to obtain the insulated wire core to be tested with the axial length equal to the preset length specifically include: after the insulated wire core of the cross-linked polyethylene cable is manufactured, the insulated wire core is cut in a radial direction according to selected first and last ends of the insulated wire core to obtain a cylindrical insulated wire core to be tested with the axial length of 5 to 10 cm.

The steps of performing the removing processing on the insulated wire core to be tested and retaining the insulating layer and inner shielding layer of the insulated wire core to be tested may specifically include: a core copper conductor of the insulated wire core to be tested is removed, with the outer shielding layer, the insulating layer and the inner shielding layer of the insulated wire core to be tested being retained; and the outer shielding layer is stripped off by using a cable ring cutter, and the insulating layer and the inner shielding layer of the insulated wire core to be tested are retained.

The step of polishing the outer surface of the insulating layer of the insulated wire core to be tested after the removing processing is performed, to obtain the to-be-tested cable sample may specifically include: the outer surface of the insulating layer of the insulated wire core to be tested after the removing processing is performed is evenly polished by a 1200-2000 grit sandpaper to obtain the to-be-tested cable sample.

Specifically, the step of heating the to-be-tested cable sample to obtain the transparent to-be-tested cable sample with the transparent insulating layer may include:

dimethyl silicone oil in a transparent oil tank is heated. After the dimethyl silicone oil is heated to a preset temperature range and the temperature remains constant, the to-be-tested cable sample is placed into the dimethyl silicone oil in a mode where a radial direction of the to-be-tested cable sample is horizontal, to heat the insulating layer of the to-be-tested cable sample to a transparent state, and the transparent to-be-tested cable sample is thus obtained.

Figures 2, 3:
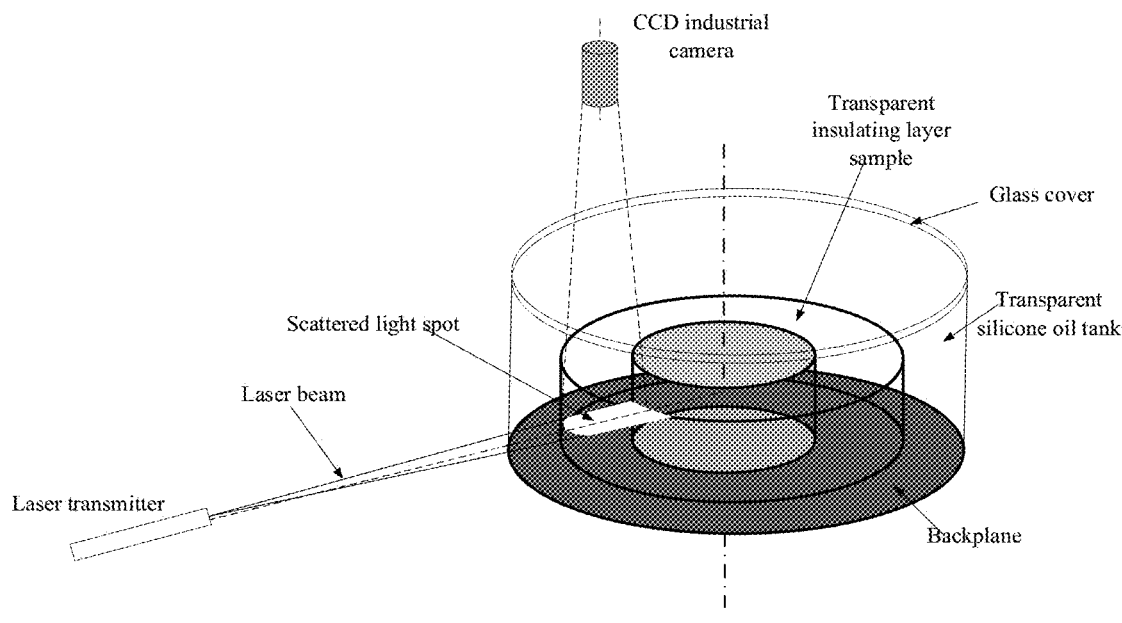
FIG. 2 is a schematic diagram illustrating a testing process of a method for evaluating a degassing effect of a cross-linked polyethylene cable according to an embodiment of the present disclosure.
FIG. 3 is a curve graph of a normalized light intensity coefficient of a sample section of a 110 kV cable after 14 days of degassing at 70° C. varying with a thickness of an insulating layer of the sample according to an embodiment of the present disclosure.

Preferably, the preset temperature range is 120° C. to 150° C. It should be appreciated that, as shown in FIG. 2, a pure white backplane is placed at a bottom portion of the transparent oil tank, the dimethyl silicone oil is added into the transparent oil tank and is heated to 120 to 150° C. After the temperature is stable and remains constant, the to-be-tested cable sample is placed into the dimethyl silicone oil at an angle such that the radial direction remains in the horizontal direction, so that the dimethyl silicone oil overflows the transparent to-be-tested cable sample, and the insulating layer of the to-be-tested cable sample is heated for 10 to 20 minutes. Accordingly. the transparent to-be-tested cable sample is obtained. It should be appreciated that the transparent to-be-tested cable sample is in a completely transparent state.

Specifically, after the transparent to-be-tested cable sample is obtained, the method may further include following step.

It should be appreciated that when the transparent to-be-tested cable sample is in the completely transparent state, the transparent oil tank is covered with a transparent glass cover to exhaust the air between the transparent glass cover and the dimethyl silicone oil. According to the embodiment of the present disclosure, uneven transparency caused by dimethyl silicone oil vapor can be avoided, and the dimethyl silicone oil vapor is prevented from attaching as droplets onto a container wall of the transparent oil tank or a surface of a CCD industrial camera lens to affect photography.

Specifically, the step of acquiring at least one light spot image of the transparent to-be-tested cable sample irradiated with the monochromatic laser light source under the darkroom condition may include:

under the darkroom condition, the insulating layer of the transparent to-be-tested cable sample is horizontally irradiated by a monochromatic laser light source emitted from a laser transmitter, to allow an axis line of the monochromatic laser light source to direct to an axis line of the transparent to-be-tested cable sample in the axial direction of the transparent to-be-tested cable sample;

the CCD industrial camera is utilized to photograph the scattered light spots produced by the monochromatic laser light source in the insulating layer of the transparent to-be-tested cable sample at a photographing angle of the CCD industrial camera perpendicular to the monochromatic laser light source, and at least one light spot image is thus obtained.

Preferably, an output optical power of the monochromatic laser light source is in a range of 0.5 to 1 milliwatts, a vertical light divergence angle is less than or equal to 2 mrad, and the monochromatic laser light source is a red laser light source with an optical wavelength in a range of 630 nm to 650 nm or a green laser light source with an optical wavelength in a range of 532 nm to 556 nm. In a preferred embodiment, the red laser light source is emitted by a helium-neon laser transmitter. The output optical power of the red laser light source is in a range of 0.5 to 1 milliwatts, the optical wavelength is equal to 0.6328 µm, and the vertical light divergence angle is less than or equal to 2 mrad.

Specifically, the step of utilizing the CCD industrial camera to photograph the scattered light spots produced by the monochromatic laser light source in the insulating layer of the transparent to-be-tested cable sample at the photographing angle of the CCD industrial camera perpendicular to the monochromatic laser light source, and obtaining the at least one light spot image may include:

the transparent to-be-tested cable sample is rotated by 90°, and the CCD industrial camera is utilized to photograph the scattered light spots produced by the monochromatic laser light source in the insulating layer of the transparent to-be-tested cable sample for each rotation of 90°, with the photographing angle of the CCD industrial camera perpendicular to the monochromatic laser light source, and four light spot images are obtained.

For example, the angle between the photographing direction of the CCD industrial camera and an incident light from the laser light source is determined as 90° through a level calibration.

In a preferred embodiment, for the same transparent to-be-tested cable sample, the maximum values of the normalized light intensity coefficients, the average values of the normalized light intensity coefficients, and the degassing uniformity coefficients in four light spot images obtained at four angular positions at equal intervals of 90 degrees are averaged respectively, to serve as the evaluation result of the degassing effect of the cross-linked polyethylene cable.

Preferably, the preset light spot image range has a length equal to a diameter of the insulating layer of the to-be-tested cable sample and a width equal to 1 mm.

It should be noted that, in the embodiment of the present disclosure, for each light spot image, data of a part of the light spot image with the length equal to the diameter of the insulating layer of the to-be-tested cable sample and the width equal to 1 mm is extracted along a centerline position of a horizontal incidence angle of the laser light source.

Specifically, the step of performing the normalization processing on the light intensity data to obtain the relationship between the thickness of the insulating layer and the normalized light intensity coefficient may include:

an average light intensity within a preset distance from the outer surface of the insulating layer of the transparent to-be-tested cable sample serves as a calibration light intensity, and light intensities corresponding to other portions are processed in proportion to obtain the normalized light intensity coefficients;

a relationship curve between the thickness of the insulating layer and the normalized light intensity coefficient is drawn according to the thickness of the insulating layer of the transparent to-be-tested cable sample and the normalized light intensity coefficients.

Preferably, the preset distance is equal to 1 mm, the average light intensity within 1 mm from the outer surface of the insulating layer of the transparent to-be-tested cable sample serves as the calibration light intensity, which is defined as 1, and light intensities corresponding to other portions of the transparent to-be-tested cable sample are converted in proportion, and the obtained coefficients are defined as the normalized light intensity coefficients. The thickness of the insulating layer of the transparent to-be-tested cable sample serves as the abscissa to draw the relationship curve between the thickness of the insulating layer and the normalized light intensity coefficients.

Preferably, a preset thickness range of the insulating layer is obtained by removing a range of 1 mm from the outer surface of the insulating layer of the transparent to-be-tested cable sample and removing a range of 1 mm from the inner surface of the insulating layer of the transparent to-be-tested cable sample. It should be appreciated that light spot data of attachments on the outer surface and the inner surface of the insulating layer of the transparent to-be-tested cable sample may be affected by other factors, and is thus inaccurate. Accordingly, in the embodiment of the present disclosure, the maximum value and the average value of the normalized light intensity coefficients of the transparent to-be-tested cable sample inside the insulating layer of the to-be-tested cable sample (i.e., excluding the range of 1 mm from the outer surface of the insulating layer of the transparent to-be-tested cable sample and the range of 1 mm from the inner surface of the insulating layer of the transparent to-be-tested cable sample) are acquired according to the relationship between the thickness of the insulating layer and the normalized light intensity coefficients.

Specifically, the step of calculating the degassing uniformity coefficient according to the maximum value and the average value may include:

The degassing uniformity coefficient is calculated according to the following formula:

$$P = Q_{av}/Q_{max}$$

where $Q_{av}$ denotes the average value of the normalized light intensity coefficients, and $Q_{max}$ denotes the maximum value of the normalized light intensity coefficients.

According to method for evaluating the degassing effect of the cross-linked polyethylene cable provided by the embodiments of the present disclosure, the to-be-tested cable sample is photographed in the direction perpendicular to the monochromatic laser light source to obtain the light spot images, the light intensity data of the light spot images is acquired in the radial direction of the insulating layer and is normalized, the maximum value and the average value of the normalized light intensity coefficients of the transparent to-be-tested cable sample in the preset thickness range of the insulating layer are obtained, the degassing uniformity coefficient is calculated and obtained, and the evaluation result of the degassing effect of the cross-linked polyethylene cable is obtained according to the maximum value, the average value and the degassing uniformity coefficient. Accordingly, the degassing effect of the cross-linked polyethylene cable is evaluated from the perspective of physical defects, which efficiently and quickly evaluates the degassing effect of the cross-linked polyethylene cable with a higher accuracy.

According to the method for evaluating the degassing effect of the cross-linked polyethylene cable provided by the embodiments of the present disclosure, the to-be-tested cable sample is photographed in the direction perpendicular to the monochromatic laser light source to obtain the light spot images, the light intensity data of the light spot images is acquired in the radial direction of the insulating layer and is normalized, the maximum value and the average value of the normalized light intensity coefficients of the transparent to-be-tested cable sample in the preset thickness range of the insulating layer are obtained, the degassing uniformity coefficient is calculated and obtained, and the evaluation result of the degassing effect of the cross-linked polyethylene cable is obtained according to the maximum value, the average value and the degassing uniformity coefficient. Accordingly, the degassing effect of the cross-linked polyethylene cable is evaluated from the perspective of physical defects, which efficiently and quickly evaluates the degassing effect of the cross-linked polyethylene cable, and has a higher accuracy. The embodiments of the present disclosure provide the following beneficial effects.

(1) An optical method is utilized to quantitatively analyze the physical micropore defects caused by cross-linking by-products, which makes up for the shortcomings of the existing technology that cannot quickly quantitatively evaluate the physical micropores caused by the cross-linking by-products.

(2) The prescribed grit sandpaper is utilized to polish the outer surface of the insulating layer to provide a uniform surface roughness, thereby providing a consistent light scattering interface. The light scattering spot intensity on the interface serves as the calibration light intensity, and the material surface with consistent optical property and the same laser transmitter are utilized, which ensures the comparability of the normalized light intensity coefficients under different test conditions, so that the calibration process of the test result is simple and reliable.

(3) The high-temperature silicone oil heating treatment is used, which can not only transform the opaque insulating layer of the thermosetting cross-linked polyethylene into the transparent insulating layer, but also use a larger coefficient of thermal expansion of the air to cause the micropores in the cable to expand under the action of high temperature, thereby increasing the sensitivity to small-sized micropore analysis.

(4) A horizontal laser is utilized to irradiate in the direction of the insulating layer of the cable, and the CCD industrial camera is utilized to photograph in the axial direction of the insulating layer of the cable. The CCD industrial camera is utilized to photograph, at the angle of 90°, the scattered light spots of the laser light source on the insulating layer through the micropores. By verification through multiple tests, the measured light intensity of the scattered light spots at this angle is greater, which increases the sensitivity during the test process. After comparative analysis, it is found that at this angle, the intensity and density of the scattered light spots have a relatively better positive correlation with the size and number of micropores, so that the size and number of physical micropore defects can be quantitatively analyzed with the help of the light intensity and density of the light spots. Samples under different degassing conditions are analyzed, i.e., the degassing effects can be compared, and the degassing process parameters can be adjusted to allow reasonable adjustment of the degassing process parameters.

In order to verify the accuracy of the method provided in the embodiment of the present disclosure, in a specific implementation, as shown in FIG. 3, FIG. 3 shows a curve of a normalized light intensity coefficient of a sample section of a 110 kV cable after 14 days of degassing at 70° C. varying with a thickness of an insulating layer of the sample. As can be seen from FIG. 3, the light intensity is maximum at the polished outer surface of the insulating layer. Due to light reflection and scattering at the inner shielding layer of the insulating layer, the light intensity at the inner shielding layer is greater than other positions in the insulating layer. The two light spots with the greater light intensities at the polished outer surface and the inner shielding layer of the insulating layer only exist within the range of 1 mm from the outer surface of the insulating layer and the range of 1 mm from the inner surface of the insulating layer, and have less effect on the light intensities of other ranges in the insulating layer, thereby not affecting the light intensity inside the insulating layer and the analysis of the micropore defects. Therefore, the data in the range of 1 mm from the outer surface of the insulating layer and in the range of 1 mm from the inner surface of the insulating layer is removed before analyzing, the light scattering intensities inside the insulating layer after 14 days of degassing at 70° C. are lower and basically consistent. After calculation, it is obtained that $Q_{av}$=0.435, $Q_{max}$=0.485, P=89.69%.

Figure 4:
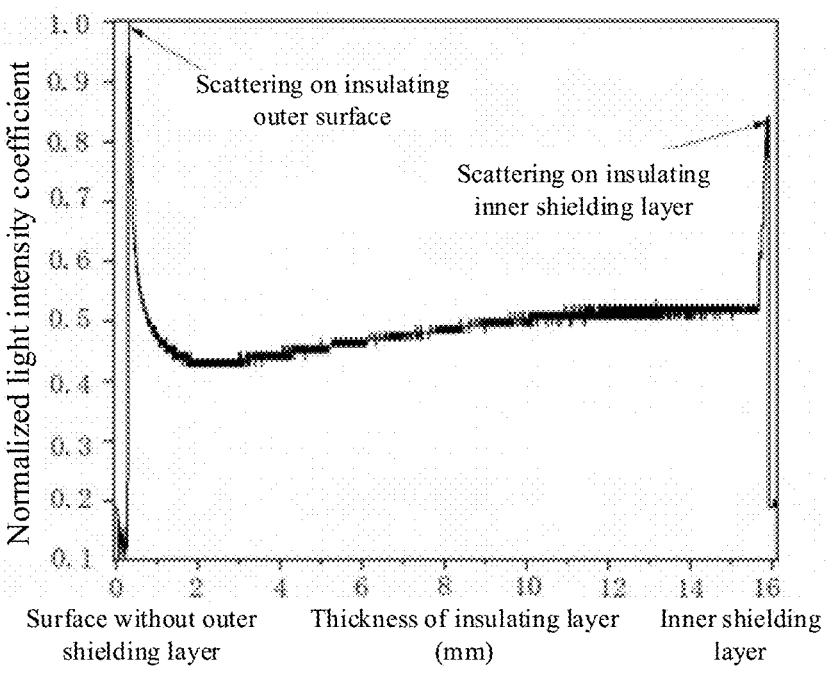
FIG. 4 is a curve graph of a normalized light intensity coefficient of a sample section of a 110 kV cable after 7 days of degassing at 70° C. varying with a thickness of an insulating layer of the sample according to an embodiment of the present disclosure.

As shown in FIG. 4, it is a curve graph of a normalized light intensity coefficient of a sample section of a 110 kV cable after 7 days of degassing at 70° C. varying with a thickness of an insulating layer of the sample. As can be seen from FIG. 4, the light intensity is maximum at the polished outer surface of the insulating layer. Due to the light reflection and scattering at the inner shielding layer of the insulating layer, the light intensity at the inner shielding layer is greater than other positions in the insulating layer. The two light spots with the greater light intensities at the polished outer surface and the inner shielding layer of the insulating layer only exist within the range of 1 mm from the outer surface of the insulating layer and the range of 1 mm from the inner surface of the insulating layer, and have less effect on the light intensities of other ranges in the insulating layer, thereby not affecting the light intensity inside the insulating layer and the analysis of the micropore defects. Therefore, the data in the range of 1 mm from the outer surface of the insulating layer and in the range of 1 mm from the inner surface of the insulating layer is removed before analyzing, the light scattering intensities inside the insulating layer after 7 days of degassing at 70° C. are generally lower, and the light scattering intensity tends to increase on the inner shielding side. After computation, it is obtained that $Q_{av}$=0.475, $Q_{max}$=0.525, P=90.47%.

Figure 5:
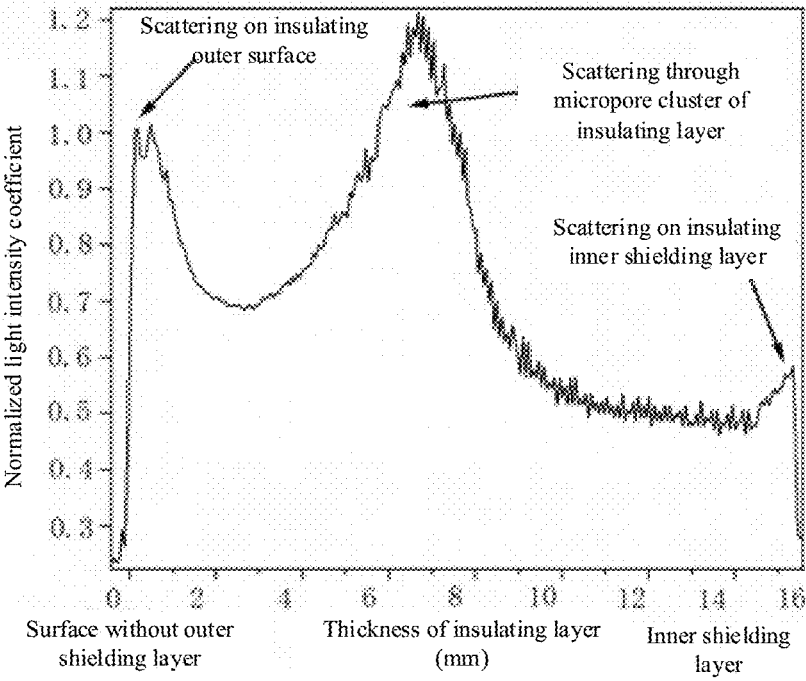
FIG. 5 is a curve graph of a normalized light intensity coefficient of a sample section of a 110 kV cable varying with a thickness of an insulating layer when the 110 kV cable is undegassed according to an embodiment of the present disclosure.

As shown in FIG. 5, it is a curve graph of a normalized light intensity coefficient of a sample section of a 110 kV cable varying with a thickness of an insulating layer when the 110 kV cable is undegassed. As can be seen from FIG. 5, the light intensity has a maximum value on the polished outer surface of the insulating layer. Due to the light reflection and scattering at the inner shielding layer of the insulating layer, the light intensity also has a maximum value at the inner shielding layer. The light spots with the greater light intensities at the polished outer surface and the inner shielding layer of the insulating layer mainly exist within the range of 1 mm from the outer surface of the insulating layer and the range of 1 mm from the inner surface of the insulating layer, and have less effect on the light intensities of other ranges in the insulating layer, and accordingly do not affect the light intensity inside the insulating layer and the analysis of the micropore defects. Therefore, the data in the range of 1 mm from the outer surface of the insulating layer and in the range of 1 mm from the inner surface of the insulating layer is removed before analyzing. In addition, There exists a significant light intensity peak inside the insulating layer, and the maximum light intensity coefficient is greater than 1, which indicates that there are a large number of micropore defects inside the sample without degassing, and the micropore distribution range is within a thickness range of 6 to 8 mm of the insulating layer. After calculation, it is obtained that $Q_{av}=0.75$, $Q_{max}=1.2$, $P=62.50\%$.

It can be seen from the test results of the cable sample section through different degassing durations that when the cable sample section is not degassed at all, there exists significant micropore defects inside the insulating layer, and the size and quantity of the micropores are larger, resulting in $Q_{av}$ and $Q_{max}$ obtained by the light scattering tests of the insulating layer are both greater, while P is smaller. After the degassing duration reaches 7 days, $Q_{av}$ and $Q_{max}$ decrease, while P increases, which indicates that the micropore defects are reduced after the degassing treatment, the size and quantity of the micropores are reduced, and accordingly the degassing uniformity is improved. After the degassing duration is further increased to 14 days, $Q_{av}$ and $Q_{max}$ further decrease, while P is basically unchanged, which indicates that the micropores are further reduced, and the degassing effect and uniformity are basically saturated. In view of this, according to the embodiments of the present disclosure, the degassing effect of a certain model of cable sample can be quantitatively and comparatively evaluated through the analysis of basic parameters, which provides a better evaluation effect on the microporous physical defects, and further provides a necessary test method support for parameter selection of the degassing process of the cable insulating layer.

The above are preferred embodiments of the present disclosure. It should be pointed out that those skilled in the art can make several improvements and modifications without departing from the principle of the present disclosure, and these improvements and modifications can also be regarded as the protection scope of the present disclosure.

What is claimed is:

1. A method for evaluating a degassing effect of a cross-linked polyethylene cable, comprising:

acquiring a to-be-tested cable sample which is a hollow cross-linked polyethylene cable insulated wire core with an insulating layer and an inner shielding layer;

heating the to-be-tested cable sample to obtain a transparent to-be-tested cable sample with a transparent insulating layer;

acquiring at least one light spot image of the transparent to-be-tested cable sample formed by irradiation under a monochromatic laser light source under a darkroom condition;

extracting light intensity data of the at least one light spot image within a preset light spot image range;

performing normalization processing on the light intensity data to obtain a relationship between a thickness of the insulating layer and a normalized light intensity coefficient;

acquiring a maximum value and an average value of normalized light intensity coefficients of the transparent to-be-tested cable sample within a preset thickness range of the insulating layer according to the relationship between the thickness of the insulating layer and the normalized light intensity coefficient;

calculating a degassing uniformity coefficient according to the maximum value and the average value; and obtaining an evaluation result of the degassing effect of the cross-linked polyethylene cable according to the maximum value, the average value, and the degassing uniformity coefficient.

2. The method for evaluating the degassing effect of the cross-linked polyethylene cable according to claim 1, wherein the acquiring the to-be-tested cable sample which is the hollow cross-linked polyethylene cable insulated wire core with the insulating layer and the inner shielding layer includes:

acquiring an insulated wire core of the cross-linked polyethylene cable;

cutting the insulated wire core to obtain an insulated to-be-tested wire core with an axial length equal to a preset length;

performing removing processing on the insulated to-be-tested wire core, and retaining the insulating layer and the inner shielding layer of the insulated to-be-tested wire core; and polishing an outer surface of the insulating layer of the insulated to-be-tested wire core after the removing processing, and obtaining the to-be-tested cable sample.

3. The method for evaluating the degassing effect of the cross-linked polyethylene cable according to claim 1, wherein the heating the to-be-tested cable sample to obtain the transparent to-be-tested cable sample with the transparent insulating layer includes:

heating dimethyl silicone oil in a transparent oil tank, after the dimethyl silicone oil is heated to a preset temperature range and the temperature remains constant, placing the to-be-tested cable sample into the dimethyl silicone oil in a mode where a radial direction of the to-be-tested cable sample is horizontal, to heat the insulating layer of the to-be-tested cable sample to a transparent state, and obtaining the transparent to-be-tested cable sample.

4. The method for evaluating the degassing effect of the cross-linked polyethylene cable according to claim 3, further comprising:

after obtaining the transparent to-be-tested cable sample, covering the transparent oil tank with a transparent glass cover to exhaust air between the transparent glass cover and the dimethyl silicone oil.

5. The method for evaluating the degassing effect of the cross-linked polyethylene cable according to claim 4, wherein the acquiring at least one light spot image of the transparent to-be-tested cable sample irradiated with the monochromatic laser light source under the darkroom condition includes:

under the darkroom condition, horizontally irradiating the insulating layer of the transparent to-be-tested cable sample by the monochromatic laser light source emitted from a laser transmitter, to allow an axis line of the monochromatic laser light source to direct to an axis line of the transparent to-be-tested cable sample in an axial direction of the transparent to-be-tested cable sample; and photographing, by a CCD industrial camera, scattered light spots produced by the monochromatic laser light source in the insulating layer of the transparent to-be-tested cable sample at an angle of the CCD industrial camera perpendicular to the monochromatic laser light source, and obtaining the at least one light spot image.

6. The method for evaluating the degassing effect of the cross-linked polyethylene cable according to claim 5, wherein the photographing, by the CCD industrial camera, scattered light spots produced by the monochromatic laser light source in the insulating layer of the transparent to-be-tested cable sample at the angle of the CCD industrial camera perpendicular to the monochromatic laser light source and obtaining the at least one light spot image includes:

rotating the transparent to-be-tested cable sample by 90°, and photographing, by the CCD industrial camera, the scattered light spots produced by the monochromatic laser light source in the insulating layer of the transparent to-be-tested cable sample for each rotation of 90°, with the photographing angle of the CCD industrial camera perpendicular to the monochromatic laser light source, and obtaining four light spot images.

7. The method for evaluating the degassing effect of the cross-linked polyethylene cable according to claim 1, wherein the preset light spot image range has a length equal to a diameter of the insulating layer of the to-be-tested cable sample and a width equal to 1 mm.

8. The method for evaluating the degassing effect of the cross-linked polyethylene cable according to claim 1, wherein the performing the normalization processing on the light intensity data to obtain the relationship between the thickness of the insulating layer and the normalized light intensity coefficient includes:

determining an average light intensity within a preset distance from the outer surface of the insulating layer of the transparent to-be-tested cable sample as a calibration light intensity, processing light intensities corresponding to other portions in proportion, and obtaining normalized light intensity coefficients; and drawing a relationship curve between the thickness of the insulating layer and the normalized light intensity coefficient according to the thickness of the insulating layer of the transparent to-be-tested cable sample and the normalized light intensity coefficients.

9. The method for evaluating the degassing effect of the cross-linked polyethylene cable according to claim 1, wherein the calculating the degassing uniformity coefficient according to the maximum value and the average value includes:

calculating the degassing uniformity coefficient according to a following formula:

$$P = Q_{av}/Q_{max}$$

where $Q_{av}$ denotes the average value of normalized light intensity coefficients, and $Q_{max}$ denotes the maximum value of the normalized light intensity coefficients.

* * * * *